US012594976B2

(12) United States Patent
de Almeida

(10) Patent No.: US 12,594,976 B2
(45) Date of Patent: Apr. 7, 2026

(54) SHUTTLE CAR BRAKING SYSTEM

(71) Applicant: INTELLIGRATED HEADQUARTERS, LLC, Mason, OH (US)

(72) Inventor: Felipe de Almeida, Miamisburg, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 497 days.

(21) Appl. No.: 18/330,151

(22) Filed: Jun. 6, 2023

(65) Prior Publication Data

US 2024/0409133 A1 Dec. 12, 2024

(51) Int. Cl.
| | |
|---|---|
| B61H 7/00 | (2006.01) |
| B61D 3/00 | (2006.01) |
| B61H 13/00 | (2006.01) |
| B65G 1/137 | (2006.01) |

(52) U.S. Cl.
CPC .................. B61H 7/00 (2013.01); B61D 3/00 (2013.01); B61H 13/00 (2013.01); B65G 1/1375 (2013.01)

(58) Field of Classification Search
CPC . B61H 7/00; B61H 13/00; B61D 3/00; B65G 1/1375; B65G 1/065; B65G 2207/40
See application file for complete search history.

(56) References Cited

U.S. PATENT DOCUMENTS

| | | | | |
|---|---|---|---|---|
| 2,894,606 A | * | 7/1959 | Bless ........................ | B64F 1/06 |
| | | | | 188/41 |
| 3,042,082 A | * | 7/1962 | Grunke ..................... | D03J 5/24 |
| | | | | 139/217 |

| | | | |
|---|---|---|---|
| 5,183,979 A | | 2/1993 | Sheridan et al. |
| 2006/0045672 A1 | | 3/2006 | Maynard et al. |
| 2006/0158043 A1 | | 7/2006 | Brouwer et al. |

(Continued)

FOREIGN PATENT DOCUMENTS

| | | |
|---|---|---|
| GB | 2491373 A | 12/2012 |

OTHER PUBLICATIONS

SICK, "Accident-free in the warehouse: Safety laser scanners monitor pallet shuttles travel path at STILL," 5 pages, (Feb. 21, 2014). [Retrieved from the Internet Nov. 6, 2023: URL: <https://www.sick.com/za/en/accident-free-in-the-warehouse-safety-laser-scanners-monitor-pallet-shuttles-travel-path-at-still/w/blog-accident-free-in-the-warehouse-safety-laser-scanners-monitor-pallet-shuttles-travel-path-at-still/>].

*Primary Examiner* — Richard M Camby
(74) *Attorney, Agent, or Firm* — Alston & Bird LLP

(57) ABSTRACT

Systems, assemblies, and/or the like are provided. According to various embodiments, a shuttle car has a first end; a second end; a platform disposed between the first and second ends, wherein the platform is configured to support and transport one or more objects; one or more attachment mechanisms, wherein the one or more attachment mechanisms are configured to be selectively deployed, wherein, when the one or more attachment mechanisms are selectively deployed, the one or more attachment mechanisms are configured to engage with one or more arresting cables and bring the shuttle car to a stop; and one or more locking mechanisms, wherein the one or more locking mechanisms are configured to secure the one or more attachment mechanisms to the first end or the second end of the shuttle car, and wherein the one or more locking mechanism are configured to selectively deploy the one or more attachment mechanisms.

7 Claims, 5 Drawing Sheets

(56)                    References Cited

U.S. PATENT DOCUMENTS

2011/0120809 A1*   5/2011   Kocher .................... B66B 9/00
                                                              187/249
2015/0066283 A1*   3/2015   Wurman ............. G05D 1/0225
                                                              701/25

* cited by examiner

SHUTTLE CAR BRAKING SYSTEM

TECHNICAL FIELD

The present disclosure relates generally to shuttle cars. In particular, it relates to emergency braking systems for shuttle cars.

BACKGROUND

In warehouse and other industrial environments, shuttle cars may be used as storage and/or retrieval systems. Shuttle cars may be configured to move along tracks, which may be positioned next to one or more storage units from which the shuttle cars may retrieve and/or transport products. Tracks and storage units may be distributed out horizontally and vertically, allowing for three-dimensional retrieval and/or transport of products by the shuttle cars.

Shuttle cars may be in wireless communication with a controller that may set movement patterns for the shuttle car. If wireless communication between the shuttle car and the controller is severed, this may cause the shuttle car to continue moving as directed until it collides with an object or communication is restored. Alternatively, a collision may result if the shuttle car loses power and is carried along the track by its momentum. In the event of a collision, catastrophic damage may result, damaging the shuttle car and potentially damaging various objects stored within the warehouse.

Through applied effort, ingenuity, and innovation, Applicant has solved problems relating to shuttle cars by developing solutions embodied in the present disclosure, which are described in detail below.

SUMMARY

In general, embodiments of the present disclosure provide shuttle cars, components of shuttle cars, and/or the like. According to various embodiments, there is provided a shuttle car including a first end; a second end; a platform disposed between the first and second ends, wherein the platform is configured to support and transport one or more objects; one or more attachment mechanisms, wherein the one or more attachment mechanisms are configured to be selectively deployed, wherein, when the one or more attachment mechanisms are selectively deployed, the one or more attachment mechanisms are configured to operably engage with one or more arresting cables and bring the shuttle car to a stop; and one or more locking mechanisms, wherein the one or more locking mechanisms are configured to secure the one or more attachment mechanisms to the first end or the second end of the shuttle car, and wherein the one or more locking mechanism are configured to selectively deploy the one or more attachment mechanisms.

In some embodiments, the one or more attachment mechanism includes a first attachment mechanism and a second attachment mechanism, wherein the one or more locking mechanisms includes a first locking mechanism and a second locking mechanism, and wherein the first attachment mechanism is secured to the first end by the first locking mechanism and the second attachment mechanism is secured to the second end by the second locking mechanism.

In some embodiments, the one or more attachment mechanism includes a hook.

In some embodiments, the one or more locking mechanisms includes a solenoid bolt.

In some embodiments, the solenoid bolt is configured to secure the one or more attachment mechanisms to the first end or the second end when then the solenoid bolt is powered, and wherein the solenoid bolt is configured to selectively deploy the one or more attachment mechanisms when the solenoid bolt is depowered.

In some embodiments, the shuttle car is configured to operably engage with a track, wherein the track is fixedly connected to a frame, and wherein the one or more arresting cables are fixedly attached to the frame.

In some embodiments, when the one or more attachment mechanisms are selectively deployed, they extend below the track.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1:
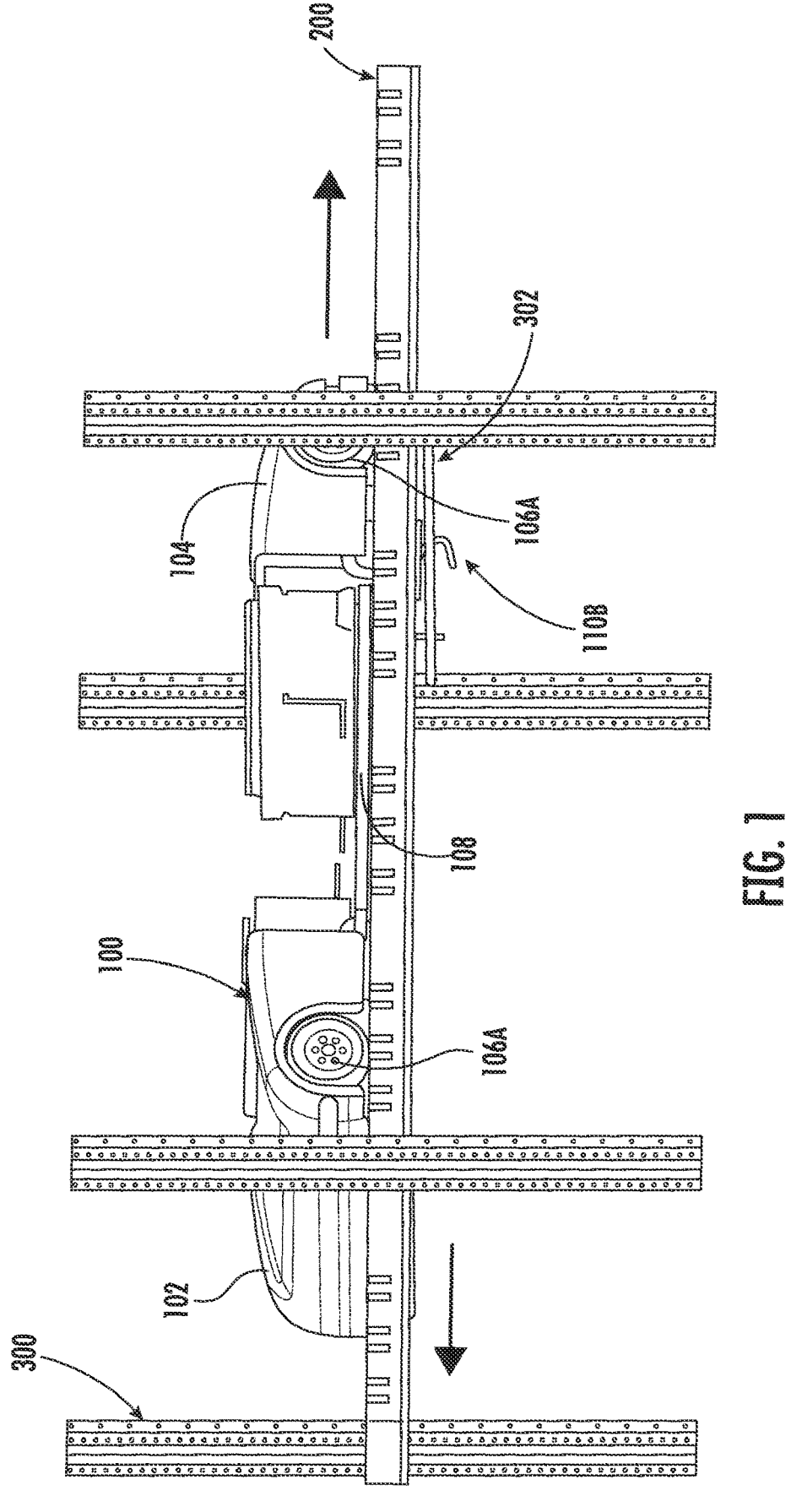
FIG. 1 is an angled perspective view of an example shuttle car on an example track in accordance with various embodiments of the present disclosure.
Figure 2:
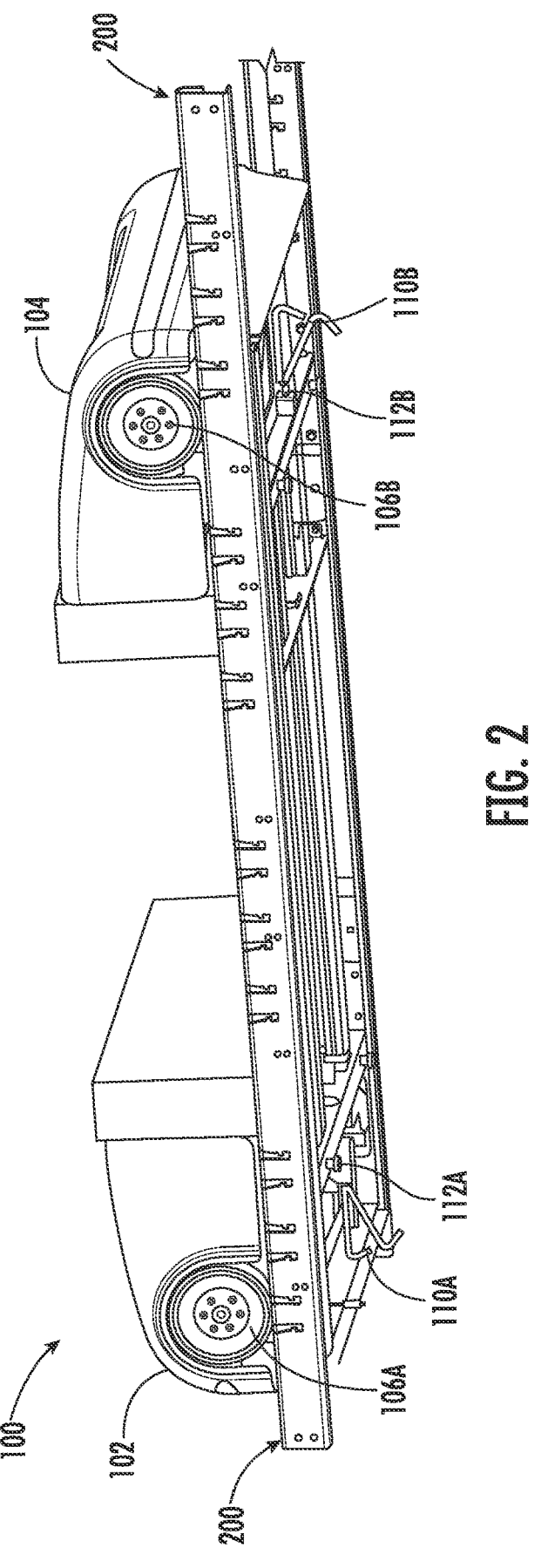
FIG. 2 is a bottom-angled view of an example shuttle car on a track in accordance with various embodiments of the present disclosure.
Figure 3:
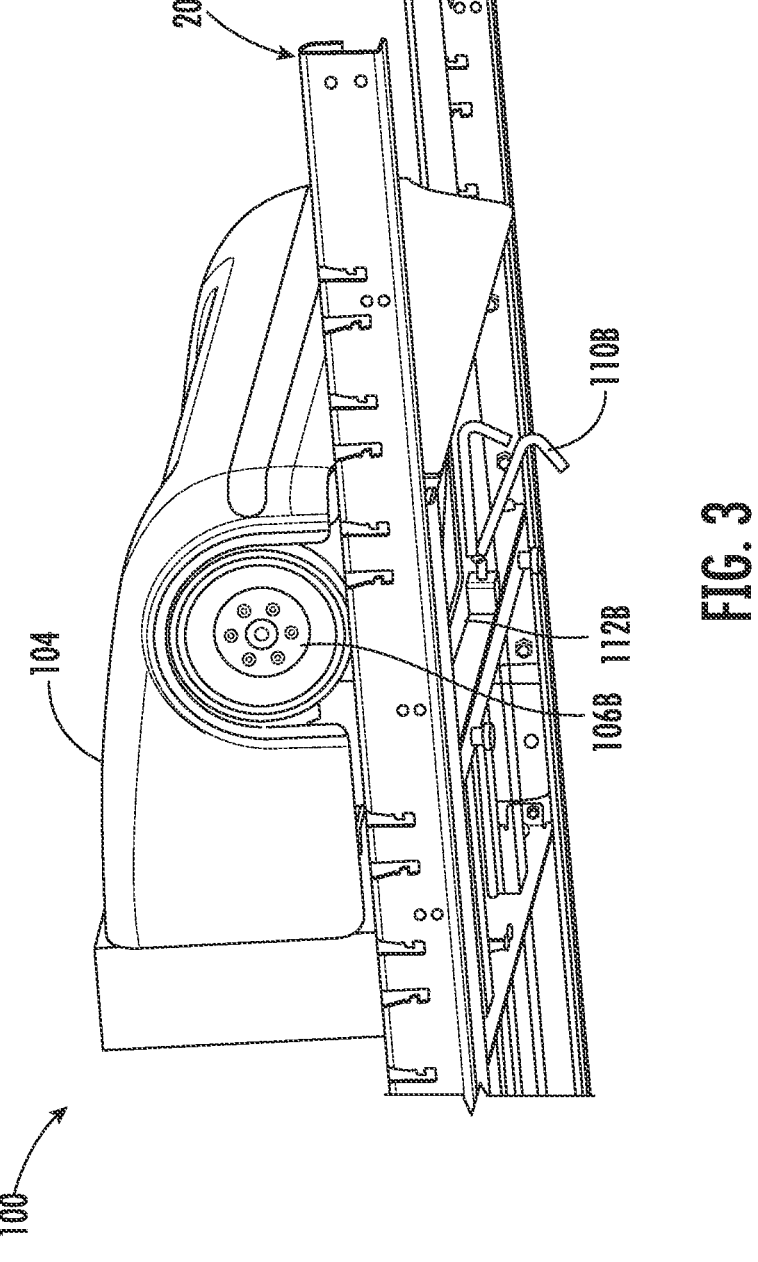
FIG. 3 is a bottom-angled view of the front of an example shuttle car in accordance with various embodiments of the present disclosure.
Figure 4:
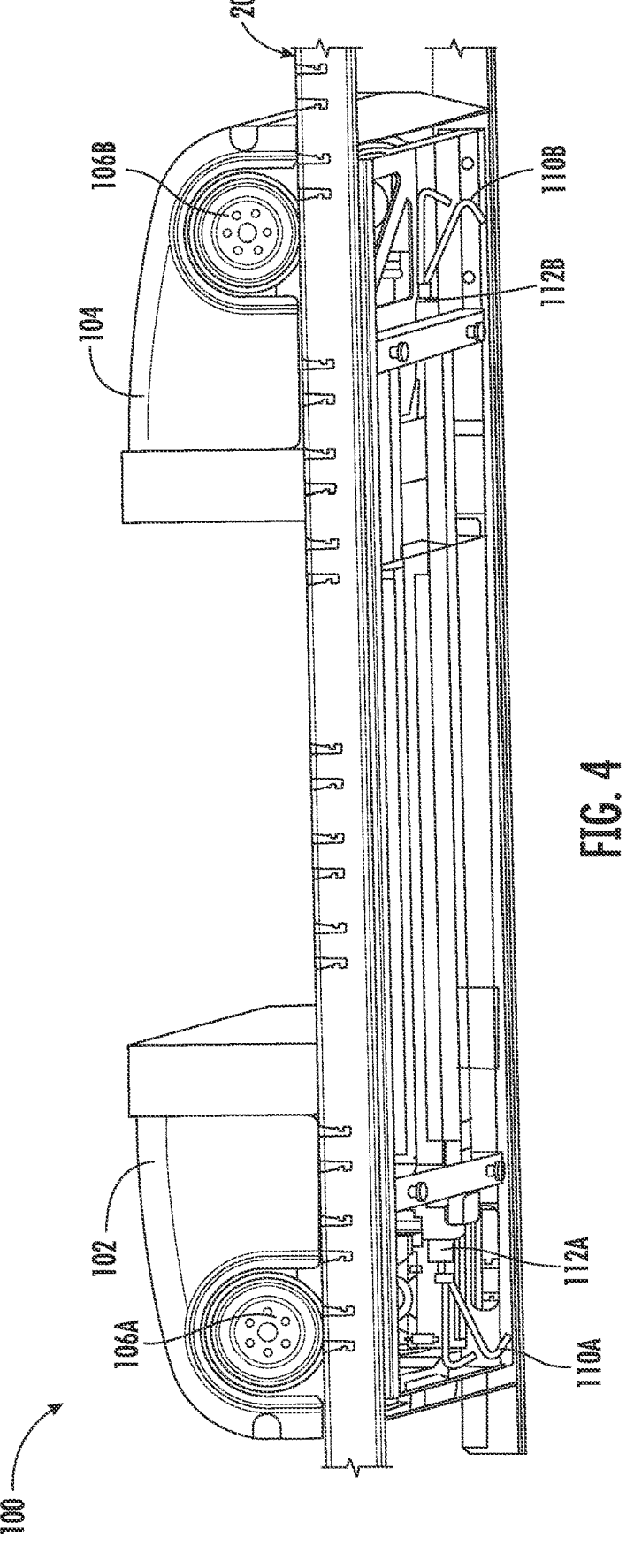
FIG. 4 is a bottom-angled view of an example shuttle car in accordance with various embodiments of the present disclosure.
Figure 5:
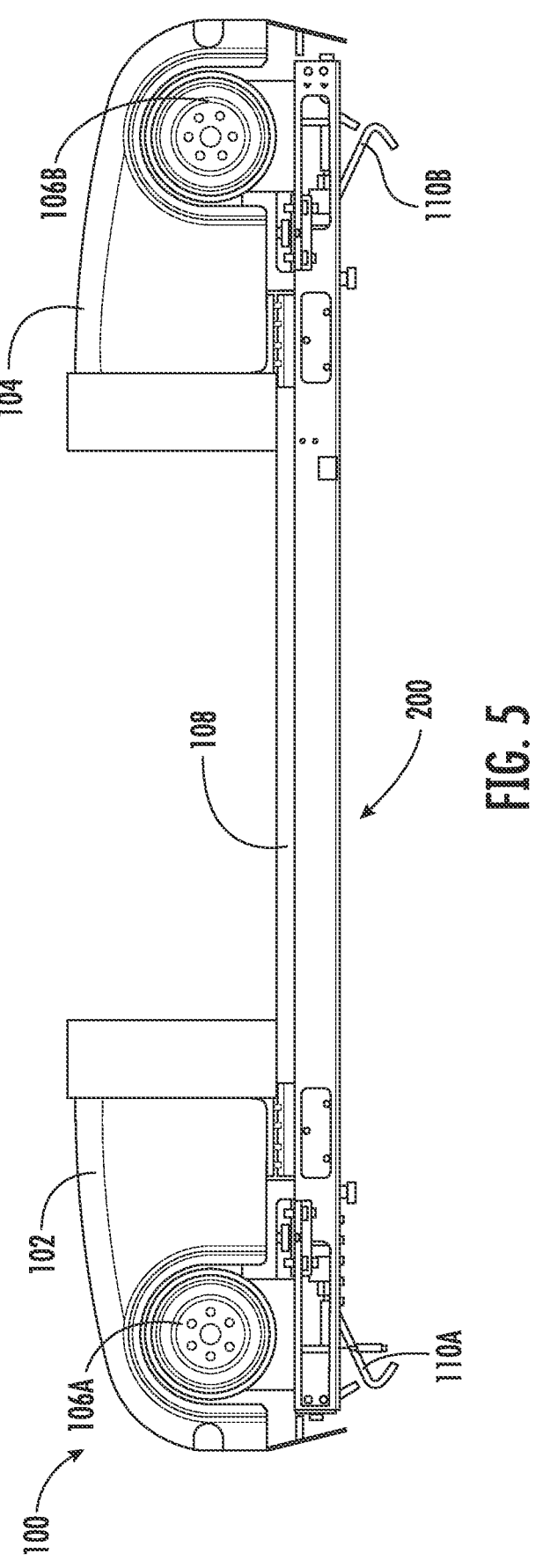
FIG. 5 is an elevation side view of an example shuttle car in accordance with various embodiments of the present disclosure.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

Shuttle cars are used, for example, in various warehouse and industrial environments, including, for example, to retrieve goods from warehouse storage and to transport goods within a warehouse. Shuttle cars may run on tracks within an example warehouse. The tracks may run adjacent to example storage units housed within a frame, allowing the shuttle cars to traverse an example warehouse and retrieve goods from storage units. Embodiments of the present disclosure relate to shuttle cars and methods of shuttle car use.

In some embodiments, a shuttle car may have a first end and a second end. In some embodiments, the shuttle car may be configured to travel along the track either in the direction of its first end or its second end and may be configured to change directions during operation. In some embodiments, a platform may be disposed between the first and second ends of the car and configured to support and/or transport one or more objects throughout the warehouse or industrial environment.

Various embodiments are described that enable a shuttle car to come to a stop during emergency situations (e.g., a loss of control caused by power loss, faulty equipment, incorrect programming, etc.). In some embodiments, a loss of control may result because the shuttle car losing communication with a wireless controller or losing power. In some embodiments, a shuttle car may have a braking system configured to bring the shuttle car to a stop.

In some embodiments, the braking system may include an attachment mechanism (e.g., a hook) that is secured to a bottom portion of the shuttle car. In some embodiments, the attachment mechanism may be secured to the bottom portion via a securing device. In some embodiments, the securing device may be configured to secure the attachment mechanism to the base only when the shuttle car (and, by extension, the securing device) is powered and/or when the shuttle car is in communication with the wireless controller. In the event that power is no longer being supplied to the shuttle car and/or wireless communication is severed, the securing device may release the attachment mechanism, thereby deploying it and positioning it to bring the shuttle car to a stop.

In some embodiments, an arresting cable may be secured to the frame and placed below the track, and further the arresting cable may be placed perpendicular to the track. In some embodiments, multiple arresting cables may be placed at various strategic locations in the frame/track. It will be understood that various materials may be used for the arresting cable, including materials of varying elasticity.

In some embodiments, the attachment mechanism may be configured to attach itself to one of the one or more arresting cables when the attachment mechanism is deployed and thereby bring the shuttle car to a stop. In some embodiments, the arresting cable may be configured to have elasticity such that it deforms in the direction of the shuttle's car's movement, thereby gradually bringing the car to a stop.

In some embodiments, multiple attachment mechanisms may be attached to the shuttle car via multiple securing devices. In some embodiments, an attachment mechanism may be disposed on both the first and second ends of the shuttle car, enabling braking in whichever direction the shuttle car is traveling.

Example Shuttle Cars

FIG. 1 shows an example shuttle car 100 on a track 200 that is fixedly attached to a frame 300. In some embodiments, the shuttle car 100 may be utilized to support and/or move one or more objects (e.g., totes) within a facility (e.g., a warehouse, a distribution center, etc.). In some embodiments, the shuttle car 100 may be remotely controlled. In some embodiments, the shuttle car 100 may be an automated storage and retrieval system (ASRS) cart.

In some embodiments, the track 200 may be a railed track. In some embodiments, the track 200 may be a powered track. In some embodiments, the track 200 may be a continuously-looping track extending throughout a facility such that the car 100 may travel its whole length in a single direction. In some embodiments, the track 200 may be located entirely within the same plane (or substantially the same plane). In some embodiments, the track 200 may be sloped or be disposed on multiple planes within the aforementioned facility.

In some embodiments, one or more objects may be supported by the frame 300 or by one or more platforms (not pictured) attached to the frame 300. For example, the frame 300 may be disposed in a distribution center and hold one or more objects for delivery. In some embodiments, the frame 300 and/or its platforms may span multiple levels and connect to multiple tracks 200. In some embodiments, the shuttle car 100 may be configured to receive, support, and/or transport the one or more objects supported by the frame 300.

In some embodiments, the shuttle car 100 may travel along the track 200 in the direction of the arrow shown in at least FIG. 1. In some embodiments, the shuttle car 100 may be configured to travel in the directions of the arrows as indicated in FIG. 1. In some embodiments, the shuttle car 100 may be powered by one or more conductor rails (e.g., 48V copper rails) that may run along the tracks 200 and may power the traversal of the shuttle car 100 along the track 200. The one or more conductor rails may be connected to the shuttle car 100 by a current collector. In some embodiments, the shuttle car 100 may be in wireless communication with one or more control devices that may direct the shuttle car 100 along the track 200.

Referring now to FIGS. 2-5, in some embodiments, the shuttle car 100 may include a first end 102 and a second end 104. In some embodiments, the first and second ends 102, 104 may each define a housing in which one or more components of the shuttle car 100 may be housed. In some embodiments, the first end 102 and second end 104 may be symmetrical; in some embodiments, they may be asymmetrical, with one or more components of the shuttle car 100 being present solely on either the first end 102 or second end 104. Unless explicitly stated otherwise, throughout this disclosure, description applying to the first end 102 applies similarly to the second end 104.

In some embodiments, the shuttle car 100 may include a platform 108. In some embodiments, the platform may be a planar, substantially rectangular platform disposed between the first and second ends 102, 104. In some embodiments, the platform 108 may connect the first and second ends 102, 104. In some embodiments, the platform 108 may be configured to support and transfer the aforementioned one or more objects from the frame 300.

In some embodiments, the shuttle car 100 may include one or more wheels 106A-D. In some embodiments, the one or more wheels 106A-D may be configured to convey the shuttle car 100 along the track 200. In some embodiments, there may be two wheels (e.g., 106A-B) disposed at the first end 102 and two wheels (e.g., 106C-D) disposed at the second end 104.

In some embodiments, the shuttle car 100 may include one or more attachment mechanisms 110A, 110B (e.g., a first attachment mechanism 110A and a second attachment mechanism 110B). In some embodiments, the one or more attachment mechanisms 110A, 110B may be a hook or similar hooking device. In some embodiments, the one or more attachment mechanisms 110A, 110B may be composed of clastic or similar "stretch" material configured to deform under one or more tension forces.

In some embodiments, the one or more attachment mechanisms 110A, 110B may be attached to the first and second ends 102, 104 of the shuttle car 100. In some embodiments, the one or more attachment mechanisms 110A, 110B may be disposed on the underside of the shuttle car 100. In some embodiments, the one or more attachment mechanisms 110A, 110B may be configured to be selectively deployed; that is, when the one or more attachment mechanisms 110A, 110B are not selectively deployed, they are flush (or positioned adjacent to) the underside of the shuttle car 100, such that they do not extend below the track 200. In some embodiments, when the one or more attachment mechanisms 110A, 110B are selectively deployed, they extend below the track (as seen in at least FIGS. 1-5).

In some embodiments, the shuttle car 100 may include one or more locking mechanisms 112A, 112B. In some embodiments, the one or more locking mechanisms 112A, 112B may be electromechanical locking mechanisms, such as solenoid locks. In some embodiments, the one or more locking mechanisms 112A, 112B may be configured to be engaged (i.e., lock into place) when they are powered and not to be engaged (i.e., not lock into place) when they are depowered. In some embodiments, the one or more locking mechanisms 112A, 112B may be in wireless communication with a control device configured to remotely lock and unlock the one or more locking mechanisms 112A, 112B.

In some embodiments, the one or more locking mechanisms 112A, 112B may be disposed on the underside of the shuttle car 100. In some embodiments, the one or more locking mechanisms 112A, 112B may be configured to secure the one or more attachment mechanisms 110A, 110B to the underside of the shuttle car 100. In some embodiments, the one or more locking mechanisms 112A, 112B may be configured to secure the one or more attachment mechanisms 110A, 110B above the track 200 when the one or more locking mechanisms 112A, 112B are engaged.

In some embodiments, one or more arresting cables 302 may be attached to the frame 300. In some embodiments, the one or more arresting cables 302 may be configured to be engaged by the one or more attachment mechanisms 110A, 110B and thereby slow and/or stop motion of the shuttle car 100 along the track 200. In some embodiments, the one or more arresting cables 302 may be "springy" arresting cables having a high degree of elasticity and configured to deform substantially when engaged with the one or more attachment mechanisms 110A, 110B. In some embodiments, multiple arresting cables 302 may be distributed throughout the frame (e.g., at set intervals).

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A shuttle car comprising:
a first end;
a second end;
a platform disposed between the first and second ends,
wherein the platform is configured to support and transport one or more objects;
one or more attachment mechanisms,
wherein the one or more attachment mechanisms are configured to be selectively deployed,
wherein, when the one or more attachment mechanisms are selectively deployed, the one or more attachment mechanisms are configured to operably engage with one or more arresting cables and bring the shuttle car to a stop; and
one or more locking mechanisms,
wherein the on or more locking mechanisms are configured to secure the one or more attachment mechanisms to the first end or the second end of the shuttle car, and
wherein the one or more locking mechanism are configured to selectively deploy the one or more attachment mechanisms.

2. The shuttle car of claim 1, wherein the one or more attachment mechanism comprise a first attachment mechanism and a second attachment mechanism,
wherein the one or more locking mechanisms comprise a first locking mechanism and a second locking mechanism, and
wherein the first attachment mechanism is secured to the first end by the first locking mechanism and the second attachment mechanism is secured to the second end by the second locking mechanism.

3. The shuttle car of claim 1, wherein the one or more attachment mechanism comprise a hook.

4. The shuttle car of claim 1, wherein the one or more locking mechanisms comprise a solenoid bolt.

5. The shuttle car of claim 4, wherein the solenoid bolt is configured to secure the one or more attachment mechanisms to the first end or the second end when then the solenoid bolt is powered, and
wherein the solenoid bolt is configured to selectively deploy the one or more attachment mechanisms when the solenoid bolt is depowered.

6. The shuttle car of claim 1, wherein the shuttle car is configured to operably engage with a track,
wherein the track is fixedly connected to a frame, and
wherein the one or more arresting cables are fixedly attached to the frame.

7. The shuttle car of claim 6, wherein, when the one or more attachment mechanisms are selectively deployed, they extend below the track.

* * * * *